United States Patent
Seki et al.

(10) Patent No.: US 7,208,237 B2
(45) Date of Patent: *Apr. 24, 2007

(54) MAGNETIC RECORDING MEDIUM

(75) Inventors: Akihiko Seki, Tokyo (JP); Takayoshi Kuwajima, Tokyo (JP); Naoto Yajima, Tokyo (JP); Hiroyuki Yamada, Tokyo (JP); Kenichi Kitamura, Tokyo (JP)

(73) Assignee: TDK Corporation, Tokyo (JP)

( * ) Notice: Subject to any disclaimer, the term of this patent is extended or adjusted under 35 U.S.C. 154(b) by 42 days.

This patent is subject to a terminal disclaimer.

(21) Appl. No.: 10/823,680

(22) Filed: Apr. 14, 2004

(65) Prior Publication Data

US 2004/0207955 A1    Oct. 21, 2004

(30) Foreign Application Priority Data

Apr. 17, 2003    (JP)    ............... 2003-112471

(51) Int. Cl.
  G11B 5/716    (2006.01)
  B05D 5/12    (2006.01)

(52) U.S. Cl. ............... 428/842.3; 428/842.5; 428/845; 427/130

(58) Field of Classification Search ............ 428/840.2, 428/840.3, 840.6, 845, 845.1, 694 BR, 323, 428/694 BB, 329; 369/283, 286; 427/127, 427/128, 130, 131, 359, 365; 29/603.13, 29/603.16, 603.2
See application file for complete search history.

(56) References Cited

U.S. PATENT DOCUMENTS 6,818,298 B2 *    11/2004    Lowery et al. ............ 428/845
6,890,646 B2 *    5/2005    Meguro et al. ............ 428/323
2004/0209121 A1 *    10/2004    Yajima et al. ........ 428/694 BB

FOREIGN PATENT DOCUMENTS

JP    62-125537    6/1987
JP    9-185822    7/1997
JP    11-31322    2/1999

OTHER PUBLICATIONS

Translation JA 11-031322.*
Translation JA 09-185822.*
JA 62-125537 abstract.*

* cited by examiner

Primary Examiner—D. Lawrence Tarazano
Assistant Examiner—Louis Falasco
(74) Attorney, Agent, or Firm—Oblon, Spivak, McClelland, Maier & Neustadt, P.C.

(57) ABSTRACT

The present invention provides a magnetic recording medium comprising a thin film magnetic layer of thickness in a range from 0.03 to 0.30 μm, and having excellent surface smoothness and superior electromagnetic conversion characteristics. The magnetic recording medium comprises a lower non-magnetic layer containing at least a non-magnetic powder and a binder resin on one surface of a non-magnetic support, an upper magnetic layer containing at least a ferromagnetic powder and a binder resin on the lower non-magnetic layer, and a back coat layer on the other surface of the non-magnetic support, wherein the thickness of the upper magnetic layer is within the range from 0.03 to 0.30 μm, the AFM surface roughness Ra of the upper magnetic layer is 6 nm or less, and the number of concavities with a depth of 30 nm or greater in the surface of the upper magnetic layer is 5 per 1 $cm^2$ of surface area or less.

3 Claims, No Drawings

MAGNETIC RECORDING MEDIUM

BACKGROUND OF THE INVENTION

1. Field of the Invention

The present invention relates to a magnetic recording medium, and more particularly to a magnetic recording medium having excellent surface smoothness and superior electromagnetic conversion characteristics.

2. Disclosure of the Related Art

A conventional magnetic recording medium comprises a magnetic layer on one side of a non-magnetic support and a back coat layer on the other side of the non-magnetic support to enhance the running durability.

In recent years, increases in the quantity of data being recorded have resulted in demands for similar increases in the recording density of magnetic recording media. In order to enable increases in recording density, a recording wavelength continues to shorten, and the thickness of the magnetic layer continues to reduce.

As the thickness of the magnetic layer is reduced, any surface roughness of the support is reflected in the surface of the magnetic layer, causing a loss in the smoothness of the magnetic layer surface and a deterioration in the electromagnetic conversion characteristics. As a result, a non-magnetic layer is provided on the support surface, for example, as an undercoat layer, and the magnetic layer is then provided on this non-magnetic layer.

As increasingly shorter recording wavelengths are being used, it is desirable to provide a flatter and improved mirror surface to the magnetic layer surface in view of spacing loss.

In view of the method for producing a magnetic recording medium, the magnetic layer is subjected to calendering to improve the smoothness of the magnetic layer surface. Calendering of the magnetic layer following formation of the back coat layer on the other side of the support has previously been reported.

For example, paragraph [0022] of Japanese Patent Laid-Open Publication No. Hei 9-185822(1997) reports that by conducting calendering with the magnetic layer and the back coat layer already provided on the support, the surface workability of the magnetic layer improves markedly, resulting in improvements in other characteristics such as the electromagnetic conversion characteristics.

Japanese Patent Laid-Open Publication No. Hei 11-31322 (1999) discloses a production process for a magnetic recording medium comprising a magnetic layer on one side of a support, which already comprises a thin film formed by vacuum deposition on at least this side, and a back coat layer provided on the other side of the support, wherein calendering of the magnetic layer is conducted following formation of the back coat layer.

Japanese Patent Laid-Open Publication No. Sho 62-125537(1987) discloses a process in which calendering of the magnetic layer and the back coat layer are conducted simultaneously while the applied coatings are cured by irradiation. However, a non-magnetic layer is mentioned in this publication, and the thickness of the magnetic layer, at 3.0 to 4.8 μm, is considerably high.

SUMMARY OF THE INVENTION

Accordingly, it is an objective of the present invention to provide a magnetic recording medium capable of controlling the problems of fluctuating factor in the film thickness of the magnetic layer and concavity-convexity in the surface smoothness that are associated with reductions in the thickness of the magnetic layer to no more than 0.3 μm, which represents the most suitable thickness value for short wavelength recording, wherein the medium comprises a thin film magnetic layer of thickness in a range from 0.03 to 0.30 μm, and displays excellent surface smoothness and superior electromagnetic conversion characteristics.

In one aspect, the present invention provides a magnetic recording medium comprising a lower non-magnetic layer containing at least a non-magnetic powder and a binder resin on one surface of a non-magnetic support, an upper magnetic layer containing at least a ferromagnetic powder and a binder resin on the lower non-magnetic layer, and a back coat layer on the other surface of the non-magnetic support, wherein the thickness of the upper magnetic layer is within the range from 0.03 to 0.30 μm, the AFM surface roughness Ra of the upper magnetic layer is 6 nm or less, and the number of concavities with a depth of 30 nm or greater in the surface of the upper magnetic layer is 5 per 1 $cm^2$ of surface area or less.

Preferably, the average major axis length of the ferromagnetic powder is 0.1 μm or less.

Preferably, the magnetic recording medium is used in a recording and reproducing system in which the minimum recording wavelength is 0.6 μm or shorter.

Furthermore, another aspect of the present invention provides a production process for a magnetic recording medium comprising a lower non-magnetic layer on one surface of a non-magnetic support, an upper magnetic layer with a thickness of 0.03 to 0.30 μm on the lower non-magnetic layer, and a back coat layer on the other surface of the non-magnetic support, comprising a step A of forming the lower non-magnetic layer by applying a non-magnetic layer coating containing at least a non-magnetic powder and a binder resin onto one surface of the non-magnetic support and subsequently drying and curing the coating, a step B of forming the upper magnetic layer by applying a magnetic layer coating containing at least a ferromagnetic powder and a binder resin onto the lower non-magnetic layer and subsequently drying the coating, a step C of forming the back coat layer by applying a back coat layer coating onto the other surface of the non-magnetic support and subsequently drying the coating, and a step D of performing calendering following completion of both the step A and the step C.

Preferably, the calendering of step D is performed following completion of both the step A and the step C but prior to the step B, and additional calendering of the step D is also performed following completion of the step B.

Preferably, the average major axis length of the ferromagnetic powder used in the process is 0.1 μm or less.

Preferably, in the process, the AFM surface roughness Ra of the produced upper magnetic layer is 6 nm or less, and the number of concavities with a depth of 30 nm or greater in the surface of the upper magnetic layer is 5 per 1 $cm^2$ of surface area or less.

According to the present invention, there is provided a magnetic recording medium comprising a thin film magnetic layer with a thickness of 0.03 to 0.30 μm that is ideally suited to short wavelength recording in which the minimum recording wavelength is 0.6 μm or shorter, which offers excellent surface smoothness and superior electromagnetic conversion characteristics. A magnetic recording medium of the present invention is particularly suitable as a linear recording tape for use with computers.

DETAILED DESCRIPTION OF THE INVENTION

Specific features of the present invention will now be described in detail.

A magnetic recording medium in accordance with the present invention comprises a lower non-magnetic layer on one surface of a non-magnetic support, an upper magnetic layer with a thickness of 0.03 to 0.30 µm on the lower non-magnetic layer, and a back coat layer on the other surface of the non-magnetic support. In the present invention, a lubricant coating and various protective coatings for protecting the magnetic layer may be applied over the magnetic layer if necessary. To improve adhesion of the applied coating and the non-magnetic support and for other purposes, a undercoat layer (adhesive layer) may be disposed on the surface of the non-magnetic support on which the magnetic layer is to be formed. The magnetic recording medium of the present invention may now be described with regard to each layer.

[Lower Non-magnetic Layer]

The lower non-magnetic layer contains carbon black, non-magnetic inorganic powders other than carbon black, and a binder resin.

Carbon black for use in the non-magnetic layer may be furnace black for rubbers, thermal black for rubbers, black for color, and acetylene black. Preferably, the carbon black has a specific surface area of 5 to 600 m$^2$/g, a DBP oil absorbance of 30 to 400 ml/100 g, and a particle size of 10 to 100 nm. Suitable carbon blacks are listed in "carbon black guide book" (ed., Carbon Blacks Association).

It is preferred that the carbon black contains minimal amounts of water-soluble sodium ions and water-soluble calcium ions: the amount of the water-soluble sodium ions is preferably 500 ppm or less, more preferably 300 ppm or less while the amount of the water-soluble calcium ions is preferably 300 ppm or less, more preferably 200 ppm or less. When contained in amounts greater than the specified range, the water-soluble sodium ions or the water-soluble calcium ions may form salts with organic acids (in particular, fatty acids) present in the coating. Such salts may seep out to the surface of the coating, causing drop-outs or an increase in the error rate.

To minimize the amounts of the water-soluble sodium ions and the water-soluble calcium ions in the carbon black, the purity of water used to terminate the reaction during the production of the carbon black or the purity of water used in the granulation process may be increased. Production processes of carbon black are described in Japanese Patent Laid-Open Publication No. Hei 11-181323(1999), Japanese Patent Laid-Open Publication No. Hei 10-46047(1998), and Japanese Patent Laid-Open Publication No. Hei 8-12898 (1996).

Various inorganic powders other than carbon black may be added to the non-magnetic layer. Examples of the inorganic powders include needle-shaped non-magnetic iron oxide (α-Fe$_2$O$_3$), CaCO$_3$, titanium oxide, barium sulfate, and α-Al$_2$O$_3$. Preferably, the inorganic powder contains minimal amounts of water-soluble sodium ions and water-soluble calcium ions: water-soluble sodium ions are preferably contained in an amount of 70 ppm or less, more preferably 50 ppm or less. When contained in amounts greater than the specified range, the water-soluble sodium ions may form salts with organic acids (in particular, fatty acids) present in the coating. Such salts may seep out to the surface of the coating, causing drop-outs or an increase in the error rate. To minimize the amounts of the water-soluble sodium ions and the water-soluble calcium ions, the inorganic powders may be washed with water.

The ratio by mass of the carbon black to the inorganic powders other than carbon black is preferably in the range of 100/0 to 5/95. If the proportion of the carbon black is less than 5 parts by mass, then the surface electric resistance is adversary affected.

Aside from the above-described materials, the lower non-magnetic layer may contain binders such as thermoplastic resins, thermosetting or thermoreactive resins, and radiation-curable (electron beam- or UV-curable) resins. These binder resins are used in proper combinations depending on the characteristics of the magnetic recording medium and the conditions for the process.

A preferred thermoplastic resin is one that has a softening temperature of 150° C. or below, an average molecular weight of 5000 to 200000, and a degree of polymerization of approximately 50 to 2000. A preferred thermosetting resin, thermoreactive resin, or a radiation-curable resin is one that has an average molecular weight of 5000 to 200000 and a degree of polymerization of approximately 50 to 2000 and can increase its molecular weight by undergoing condensation, addition, or other reaction processes when heated and/or irradiated with radiation (electron beam or UV) after being coated, dried, and calendered.

Of these binder resins, particularly preferred are combinations of nitrocellulose and polyurethane resins and combinations of vinyl chloride type copolymers and polyurethane resins.

A preferred vinyl chloride type copolymer is one with the vinyl chloride content of 60 to 95% by mass, in particular 60 to 90% by mass, and with the average degree of polymerization of approximately 100 to 500.

Examples of such vinyl chloride type resins include vinyl chloride-vinyl acetate-vinyl alcohol copolymers, vinyl chloride-hydroxyalkyl(meth)acrylate copolymers, vinyl chloride-vinyl acetate-maleic acid copolymers, vinyl chloride-vinyl acetate-vinyl alcohol-maleic acid copolymers, vinyl chloride-vinyl acetate-hydroxyalkyl(meth)acrylate copolymers, vinyl chloride-vinyl acetate-hydroxyalkyl(meth)acrylate-maleic acid copolymers, vinyl chloride-vinyl acetate-vinyl alcohol-glycidyl(meth)acrylate copolymers, vinyl chloride-hydroxyalkyl(meth)acrylate-glycidyl(meth)acrylate coplymers, and vinyl chloride-hydroxyalkyl(meth)acrylate copolymers. Of these, copolymers of vinyl chloride and monomers having an epoxy (glycidyl) group are particularly preferred.

A preferred vinyl chloride type copolymer is one that contains sulfate group (—OSO$_3$Y) and/or sulfo group (—SO$_3$Y), which are each a polar group and are referred to as S-containing polar group, hereinafter, to increase the dispersibility. While Y in the S-containing polar groups may be any of H and alkali metals, particularly preferred S-containing polar groups are those in which Y is potassium, namely, —OSO$_3$K and —SO$_3$K. The vinyl chloride type copolymer may contain either one of the two S-containing polar groups or it may contain both of them, in which case the two polar groups may be contained at any proportions.

"Polyurethane resin" for use with the vinyl chloride type resin is a general term that encompasses all resins obtained through reactions between a hydroxyl-containing resin, such as a polyester polyol and/or a polyether polyol, and a polyisocyanate-containing compound. Such resins have an average molecular weight of approximately 5000 to 200000 and a Q-value (defined as mass average molecular weight/number average molecular weight) of approximately 1.5 to 4.

A preferred polyurethane resin may include a polar group on ends or side chains thereof. Polyurethane resins having a polar group with sulfur and/or phosphorus are particularly preferred.

Examples of the polar groups contained in the polyurethane resin are S-containing groups, such as —$SO_3M$, —$OSO_3M$, and —SR, P-containing polar groups, such as —$PO_3M$, —$PO_2M$, —POM, —P=O($OM_1$)($OM_2$), and —OP=O($OM_1$)($OM_2$), —COOM, —OH, —$NR_2$, —$N^+R_3X^-$ (where M, $M_1$, and $M_2$ are each independently H, Li, Na, or K; R is H or a hydrocarbon; and X is halogen atom), epoxy group, and —CN. Preferably, the polyurethane resin used includes at least one of these polar groups, which is introduced into the resin molecules through copolymerization or addition reaction. The polar group is preferably contained in the resin molecule in an amount of 0.01 to 3% by mass and may present either in the main chain of the resin molecules or in their branches.

Preferably, the polyurethane resin has a glass transition temperature Tg in the range of −20° C. to 80° C.

Using known techniques, such polyurethane resins can be obtained by reacting, in the presence or in the absence of a solvent, a material that contains a compound having a particular polar group and/or a resin material reacted with a compound having a particular polar group.

Aside from the vinyl chloride type copolymer and the polyurethane resin, various known resins may be added to the non-magnetic layer in an amount of 20% by mass or less with respect to the amount of the entire binder.

Examples of the thermoplastic resins other than the vinyl chloride type copolymers and the polyurethane resins include (meth)acrylic resins, polyester resins, acrylonitrile-butadiene type copolymers, polyamide resins, polyvinylbutyral, nitrocellulose, styrene-butadiene type copolymers, polyvinyl alcohol resins, acetal resins, epoxy type resins, phenoxy type resins, polyether resins, polyfunctional polyethers such as polycaprolactones, polyamide resins, polyimide resins, phenol resins, polybutadiene elastomers, chlorinated rubbers, acrylic rubbers, isoprene rubbers, and epoxy-modified rubbers.

Examples of the thermosetting resins include phenol resins, epoxy resins, polyurethane resins, urea resins, butyral resins, formal resins, melamine resins, alkyd resins, silicone resins, acrylic reactive resins, polyamide resins, epoxy-polyamide resins, saturated polyester resins, and urea formaldehyde resins.

Preferably, a crosslinking agent is used to harden the binder resin. While various polyisocyanates, especially diisocyanates, are suitably used as the crosslinking agent, at least one selected from tolylene diisocyanate, hexamethylene diisocyanate, and methylene diisocyanate is particularly preferred. It is particularly preferred that these crosslinkers are modified with a compound having a plurality of hydroxyl groups, such as trimethylolpropane, or that they are provided in the form of an isocyanulate-type crosslinker in which three molecules of a diisocyanate compound have been bound. In this manner, the crosslinkers can bind to functional groups present in the binder resins to thereby crosslink the resin. Preferably, the crosslinking agent is used in an amount of 10 to 30 parts by mass with respect to 100 parts by mass of the binder resin. In general, such thermosetting resins can be cured by heating them in an oven at 50 to 70° C. for 12 to 48 hours.

Also, the above-described binder resins may be modified to be electron-beam sensitive by introducing (meth)acrylic double bonds using known techniques. Several techniques for carrying out this modification are known: urethane modification, in which an adduct of tolylene diisocyanate (TDI) and 2-hydroxyethyl(meth)acrylate (2-HEMA) is reacted with the resin; modified urethane modification, in which a monomer (such as 2-isocyanate ethyl(meth)acrylate) that includes one or more ethylenic unsaturated double bonds and one isocyanate group within one molecule but not a urethane bond is used; and ester modification, in which a compound having a (meth)acryl group and an carboxylic anhydride or a dicarboxylic acid is reacted with a resin having a hydroxyl group or a carboxylic acid group. Of these techniques, modified urethane modification is preferred since, according to this technique, the resin does not become brittle even when a high proportion of vinyl chloride type resin is used and the technique provides coatings with high dispersibility and good surface smoothness.

When such an electron beam-curable binder resin is used, a known polyfunctional acrylate may be added in an amount of 1 to 50 parts by mass, preferably 5 to 40 parts by mass, with respect to 100 parts by mass of the binder resin, so as to enhance the crosslinking of the resin.

The amount of the binder resin used in the lower non-magnetic layer is preferably in the range of 10 to 100 parts by mass, and more preferably 12 to 30 parts by mass, with respect to 100 parts by mass of the carbon black and the inorganic powders other than carbon black combined. Too small an amount of the binder resin may result in a decreased proportion of the binder resin in the lower non-magnetic layer and, thus, insufficient coating strength. Conversely, too large an amount of the binder may lead to a dispersion failure upon preparation of the coating for the lower non-magnetic layer. As a result, the desired flat non-magnetic layer surface can no longer be obtained.

When necessary, the lower non-magnetic layer contains a lubricant. The lubricant may be any of known lubricants, including saturated or unsaturated fatty acids, fatty acid esters, and sugars, which may be used either individually or as a mixture of two or more. A preferred lubricant may comprise a mixture of two or more fatty acids with different melting points or a mixture of two or more fatty acid esters with different melting points. Such a lubricant is advantageous in that it can be adapted to any temperature condition under which the magnetic recording medium is used. The lubricant is continuously delivered to the surface of the medium.

Specific examples of the fatty acids include straight-chained saturated fatty acids, such as stearic acid, palmitic acid, myristic acid, lauric acid, and erucic acid; branched saturated fatty acids, such as isocetyl acid, and isostearic acid; and unsaturated fatty acids, such as oleic acid, linoleic acid, and linolenic acid.

Examples of the fatty acid esters include straight-chained saturated fatty acid esters, such as butyl stearate, and butyl palmitate; branched saturated fatty acid esters, such as isocetyl stearate, and isostearyl stearate; unsaturated fatty acid esters, such as isostearyl oleate; fatty acid esters of unsaturated alcohols, such as oleyl stearate; esters formed of unsaturated fatty acids and unsaturated alcohols, such as oleyl oleate; esters of diols, such as ethyleneglycol distearate; esters formed of diols and unsaturated fatty acids, such as ethyleneglycol monooleate, ethyleneglycol dioleate, and neopentylglycol dioleate; and esters formed of sugars and saturated or unsaturated fatty acids, such as sorbitan monostearate, sorbitan tristearate, sorbitan monooleate, and sorbitan trioleate.

While the amount of the lubricant in the lower non-magnetic layer can be adjusted depending on its purpose, the lubricant is preferably used in an amount of 1 to 20% by mass with respect to the total mass of the carbon black and the inorganic powders other than carbon black.

The coating for forming the lower non-magnetic layer is prepared by adding an organic solvent to the above-described components. Such an organic solvent may be any organic solvent and is typically one or a combination of two or more solvents selected from various solvents, including ketone type solvents, such as methyl ethyl ketone, methyl isobutyl ketone, and cyclohexanone; and aromatic type solvents, such as toluene. The organic solvent is preferably used in an amount of 100 to 900 parts by mass with respect to 100 parts by mass of the carbon black, the various inorganic powders other than carbon black, and the binder resin combined.

The lower non-magnetic layer typically has a thickness of 0.1 to 2.5 μm, and preferably 0.3 to 2.3 μm. The lower non-magnetic layer, when too thin, becomes more likely to be affected by the surface roughness of the non-magnetic support. As a result, the surface smoothness of the non-magnetic layer is adversely affected, as is the surface smoothness of the magnetic layer. This often results in a decreased electromagnetic conversion characteristic. Also, too thin a non-magnetic layer leads to an increased light transmittance, causing problems when tape ends are detected by the changes in the light transmittance. On the other hand, making a non-magnetic layer thicker than a certain thickness would correspondingly improve the performance of the magnetic recording medium.

[Upper Magnetic Layer]

The upper magnetic layer contains at least a ferromagnetic powder and a binder resin The average major axis length of the ferromagnetic powder is preferably 0.1 μm or less. By using a ferromagnetic powder with a short major axis length, the filling factor of the coating can be improved, making transfer from the back coat layer less likely. The average major axis length of the ferromagnetic powder preferably falls within a range from 0.03 to 0.10 μm. If the average major axis length of the ferromagnetic powder exceeds 0.1 μm, then increasing the filling factor of the coating becomes impossible, and the layer becomes prone to transfer from the back coat layer. In contrast if the average major axis length of the ferromagnetic powder is less than 0.03 μm, then the magnetic anisotropy weakens, making orientation more difficult, and increasing the likelihood of a decrease in output.

A preferred ferromagnetic powder for use in the present invention is a magnetic metal powder or a planar hexagonal fine powder. The magnetic metal powder preferably has a coersive force Hc of 118.5 to 237 kA/m (1500 to 3000 Oe), a saturation magnetization σs of 120 to 160 Am$^2$/kg (emu/g), an average major axis length of 0.03 to 0.1 μm, an average miner axis length of 10 to 20 nm, and an aspect ratio of 1.2 to 20. Also, the magnetic recording medium made by using the magnetic metal power preferably has an Hc value of 118.5 to 237 kA/m (1500 to 3000 Oe). The planar hexagonal fine powder preferably has a coersive force Hc of 79 to 237 kA/m (1000 to 3000 Oe), a saturation magnetization σs of 50 to 70 Am$^2$/kg (emu/g), an average planar particle size of 30 to 80 nm, and a plate ratio of 3 to 7. Also, the magnetic recording medium made by using the planar hexagonal fine powder preferably has an Hc value of 94.8 to 173.8 kA/m (1200 to 2200 Oe).

The average major axis length of the ferromagnetic powder can be determined by separating the ferromagnetic powder from a tape fragment, taking a photograph of a sample of the ferromagnetic powder using a transmission electron microscope (TEM), and measuring the lengths of the major axes of the powder based on this photograph. One example of this process is described below. (1) Remove the back coat layer from a tape fragment by wiping with a solvent. (2) Immerse the remaining tape fragment, which still comprises the lower non-magnetic layer and the upper magnetic layer on the non-magnetic support, in a 5% aqueous solution of NaOH, and heat with constant stirring. (3) Isolate the coatings that have separated from the non-magnetic support, wash with water, and dry. (4) Subject the dried coatings to ultrasound treatment in methyl ethyl ketone (MEK), and collect the magnetic powder by adsorption onto a magnetic stirrer. (5) Separate the magnetic powder from the residual liquid and dry. (6) Collect the magnetic powders obtained in steps (4) and (5) using a special mesh, prepare a TEM sample, and photograph the sample using a TEM. (7) Measure the lengths of the major axes of the magnetic powder from the photograph, and calculate the average length (sample number: n=100).

The production of the magnetic metal powder uses a ferric oxyhydrate as a starting material. This material can be obtained by blowing an oxidative gas through an aqueous suspension of a ferrous salt and an alkali. A preferred ferric oxyhydrate is α-FeOOH. In a first process for producing α-FeOOH, a ferrous salt is neutralized with an alkali hydroxide to form an aqueous suspension of Fe(OH)$_2$, and an oxidative gas is then blown into the suspension to form a needle-shaped α-FeOOH product. In a second process for producing α-FeOOH, a ferrous salt is neutralized with an alkali carbonate to form an aqueous suspension of FeCO$_3$, and an oxidative gas is then blown into the suspension to form a spindle-shaped α-FeOOH product.

The ferrous salt for use in these processes may be any of ferrous chloride, ferrous nitride, and ferrous sulfate. The alkali hydroxide for use in the first process may be potassium hydroxide, sodium hydroxide, or aqueous ammonia. The alkali carbonate for use in the second process may be sodium carbonate, sodium bicarbonate, or ammonium carbonate.

In the first process, it is preferred to use 2 to 10 times as much alkali as required to neutralize the ferrous salt, so that the oxidation of Fe(OH)$_2$ takes place under highly basic conditions. The α-FeOOH product obtained in this manner is suitable for making a magnetic metal powder that is fine, has no branches, and offers a high dispersibility and a high packing ability. It is necessary that the process be carried out under highly basic conditions to ensure that the resulting particles are unbranched. As it is known, one way to control the particle size is by controlling the reaction temperature and the volume of the oxidative gas blown into the suspension. Alternatively, the particle size may be controlled by carrying out the neutralization of the ferrous salt with the alkali in the presence of a metal salt, such as a salt of Ni, Co, Al, and Si, and then carrying out the oxidation.

The second process tends to produce fine particles of a spindle-shaped, unbranched α-FeOOH product that have uniform particle sizes. In the second process, the particle size can be controlled by varying the ferrous concentration in the aqueous suspension, the reaction temperature, and the volume of the oxidative gas blown into the suspension. As with the first process, the particle size can also be controlled by the addition of Ni, Co, or the like.

One exemplary method for producing a magnetic metal powder will now be described in which the needle-shaped α-FeOOH product obtained in the first process is used as a starting material. First, ferrous salt is neutralized with twice as much or more of an alkaline hydroxide as is required to just neutralize the ferrous salt to form an alkaline suspension of Fe(OH)$_2$. An oxidative gas is then blown into the suspension to obtain a needle-shaped α-FeOOH product. To control the needle-shaped ratio and the shape of the α-FeOOH product, the ferrous salt may be doped with metals such as Ni, Co, Zn, Cr, Mn, Zr, Al, Si, P, Ba, Ca, Mg, Cu, Sr, Ti, Mo, Ag, and rare earth elements. These heterogenous metals may be uniformly mixed with the ferrous salt or they may be added during the reaction. The amounts added can be empirically determined by the desired shape and the size of the product.

In this process, the ferrous salt is neutralized with an alkali to form a suspension of Fe(OH)$_2$, which is then oxidized to produce α-FeOOH. By using twice as much or more of the alkaline as is required to neutralize the ferrous salt, the resultant α-FeOOH can be used as a starting material to produce a magnetic metal powder with high coersive force. While the degree of branching of the resulting α-FeOOH can be further reduced by adding the alkali in larger excess, the alkali, when added in excessive amounts of 10 times or more, does not further improve the effect and thus is not effective.

Also, it is necessary that the α-FeOOH particles required to produce a favorable magnetic metal powder have a size such that its specific surface area as measured in BET value falls within the range of 60 to 130 m$^2$/g. The specific surface area that is less than 60 m$^2$/g indicates that the particles are too large to provide a high coersive force and thus are suitable as a magnetic material used in a single wavelength region. In comparison, the specific surface area that is greater than 130 m$^2$/g indicates that the particles are too small to provide a high coersive force although they may exhibit superparamagnetism. Too large a specific surface area also indicates a wide distribution of coersive force, which may be due to non-uniform particles.

Next, at least one of Ni, Co, Al, Si and rare earth elements is added to the α-FeOOH, which may or may be doped with Ni, Co, Zn, Cr, Mn, Zr, Al, Si, P, Ba, Ca, Mg, Cu, Sr, Ti, Mo, Ag, and a rare earth element. The addition is typically carried out by neutralizing different metal salts with an acid or an alkali to deposit film of fine crystals of hydroxides on the surface of the particles. While Ni, Co, and rare earth elements may not have to be deposited on the surface of the α-FeOOH particles, provided that the α-FeOOH product is doped with sufficient amounts of the dopants, these elements may be further deposited on the surface of the particles when it is desired to increase the amounts of the elements present in the α-FeOOH product since the α-FeOOH product can only be doped to a limited degree. The metal elements are preferably present in the magnetic metal powder in the following ranges, where figures indicate the ratio by mass of each metal assuming the mass of iron to be 100:

Ni=0.3–8.0
Co=3.0–45.0
Al=0.5–8.0
Si=0.5–8.0 and
rare earth element=0.2–10.0,
provided that Al+Si=2.0–15.0.

The rare earth metal is at least one selected from the group consisting of La, Ce, Pr, Nd, Sm, Gd, Dy, and Y. The metals may be effectively used in combinations. Preferably, the metals are added in the form of water-soluble salts, such as chlorides, sulfates, and nitrates. Si is preferably added in the forms of sodium metasilicate, sodium orthosilicate, and water-glass. The metals are deposited in the following order: First, Ni and Co, which form an alloy and serve to control magnetic characteristics of the magnetic metal powder, are deposited, followed by deposition of Al and Si, which serve to prevent the sintering of the particles by heat. The rare earth metals, which act to increase α force, can achieve the effect more significantly when they are present internally, though they are somewhat effective when deposited with Al and/or Si.

After predetermined amounts of the metals have been deposited, the metals are thoroughly washed with water, are dried, and are then heat-treated at 300 to 800° C. in a non-reductive atomosphere. If the heat treatment is carried out at temperatures below 300° C., then the resulting α-Fe$_2$O$_3$ particles, generated in the dehydration of α-FeOOH, tend to contain numerous pores. As a result, the characteristics of the reduced magnetic metal powder are deteriorated. On the other hand, if the heat treatment is carried out at temperatures higher than 800° C., then the α-Fe$_2$O$_3$ particles start to melt and are deformed or sintered. As a result, the characteristics of the resulting magnetic metal powder are deteriorated.

Following the heat treatment, the magnetic metal powder is reduced at a temperature of 300° C. to 600° C. in a stream of hydrogen gas. This results in the formation of an oxide film on the surface of the particles and, as a result, the magnetic metal powder is obtained. To reduce the amounts of water-soluble sodium ions and water-soluble calcium ions in the magnetic metal powder, the purity of water for use in the above-described process may be increased, or a sodium- or calcium-free alkali may be used.

The following processes are known for the production of hexagonal ferrite. Any of these processes may be properly used.

(i) Glass crystallization technique, in which barium oxide, iron oxide, a metal oxide to replace iron, and boron oxide as a glass-forming material are mixed to form a ferrite composition, which in turn is melted and is then quenched to form an amorphous body. Subsequently, the amorphous body is again subjected to a heat treatment, is washed, and is then crashed into a barium ferrite crystal powder.

(ii) Aqueous heat reaction technique, in which a solution of metal salts of barium ferrite composition is neutralized with an alkali, followed by removal of the by-products. The solution is then heated at 100° C. or above and is subsequently washed, dried, and then crashed into a barium ferrite crystal powder.

(iii) Co-precipitation technique, in which a solution of metal salts of barium ferrite composition is neutralized with an alkali, followed by removal of the by-products. The solution is subsequently dried, is treated at 1100° C. or below, and is then crashed into a barium ferrite crystal powder.

To reduce the amounts of water-soluble sodium ions and water-soluble calcium ions in the hexagonal ferrite powder, the purity of water for use in each of the above-described processes (i), (ii), and (iii) may be increased, or a sodium- or calcium-free alkali may be used.

The ferromagnetic powder preferably contains the water-soluble sodium ions in an amount of 70 ppm or less, more preferably 50 ppm or less. Also, the ferromagnetic powder preferably contains the water soluble-calcium ion in an amount of 30 ppm or less, more preferably 20 ppm or less.

When contained in amounts greater than the specified range, these ions may form salts with organic acids (in particular, fatty acids) present in the coating. Such salts may seep out to the surface of the coating, causing drop-outs or an increase in the error rate.

Preferably, such a ferromagnetic powder is contained in an amount of about 70 to 90% by mass with respect to the magnetic layer. Too large an amount of the ferromagnetic powder leads to a decreased amount of the binder and tends to result in a decreased surface smoothness after calendering. Conversely, too small an amount of the ferromagnetic powder cannot achieve high reproduction output.

The magnetic layer may contain any suitable binder, such as a thermoplastic resin, thermosetting or thermoreactive resin, and radiation-curable (electron beam- or UV-curable) resin. These binder resins are used in proper combinations depending on the characteristics of the magnetic recording medium and the conditions for the process. The binders can be properly selected from those described with reference to the lower non-magnetic layer.

The amount of the binder resin used in the magnetic layer is preferably in the range of 5 to 40 parts by mass, and more preferably 10 to 30 parts by mass, with respect to 100 parts by mass of the ferromagnetic powder. Too small an amount of the binder may result in a decreased strength and, thus, a decreased running durability of the magnetic layer. Conversely, too large an amount of the binder may lead to a decreased amount of the ferromagnetic powder, thus lowering the electromagnetic conversion characteristics.

The magnetic layer further contains an abrasive having a Mohs hardness of 6 or higher for the purposes of increasing the mechanical strength of the magnetic layer and preventing clogging of the magnetic head. Examples of the abrasives are those with a Mohs hardness of 6 or higher, preferably 9 or higher, including α-alumina (Mohs hardness=9), chromium oxide (Mohs hardness=9), silicon carbide (Mohs hardness=9.5), silicon oxide (Mohs hardness=7), aluminum nitride (Mohs hardness=9), and boron nitride (Mohs hardness=9.5). Preferably, at least one of these abrasives is added to the magnetic layer. The abrasives are generally amorphous and thus serve to prevent clogging of the magnetic head and to increase the coating strength.

The abrasive has an average particle size of for example 0.01 to 0.2 μm, preferably 0.05 to 0.2 μm. If the average particle size of the abrasive is too large, then the projections from the surface of the magnetic layer become significant, causing a decrease in the electromagnetic conversion characteristics, an increase in the drop-outs, and an increase in the head wear. Conversely, if the average particle size of the abrasive is too small, then the protrusions from the surface of the magnetic layer will become relatively small, leading to insufficient prevention of clogged heads.

In general, the average particle size is measured using a transmission electron microscope. The amount of the abrasive is typically in the range of 3 to 25 parts by mass, preferably in the range of 5 to 20 parts by mass, with respect to 100 parts by mass of the ferromagnetic powder.

When necessary, the magnetic layer may further contain a dispersing agent such as a surfactant, a lubricant such as a higher fatty acid, a fatty acid ester and, a silicone oil, and various other additives.

A preferred coating for forming the magnetic layer can be prepared by adding an organic solvent to the above-described components. Such an organic solvent may be any suitable organic solvent and may be those used in the lower non-magnetic layer.

The magnetic layer typically has a thickness of 0.03 to 0.30 μm, preferably 0.10 to 0.25 μm. The magnetic layer that is too thick can result in an increase in the self-demagnetization loss and the thickness loss.

In the present invention, the smoothness of the surface of the magnetic layer is an important factor. The centerline average roughness (Ra) of the surface of the magnetic layer is preferably within a range from 1.0 to 8.0 nm, and even more preferably from 2.0 to 7.0 nm. At Ra values less than 1.0 nm, the surface becomes overly smooth, causing a deterioration in the running stability and an increase in the likelihood of trouble during running of the tape. In contrast, if the Ra value exceeds 8.0 nm, then the surface of the magnetic layer becomes overly rough, resulting in a deterioration in the reproduction output and other electromagnetic conversion characteristics in reproducing systems that use MR heads.

The ten-point average centerline roughness (Rz) of the surface of the magnetic layer is preferably within a range from 5 to 25 nm, and even more preferably from 5 to 20 nm. At Rz values less than 5 nm, the surface becomes overly smooth, causing a deterioration in the running stability and an increase in the likelihood of trouble during running of the tape. In contrast, if the Rz value exceeds 25 nm, then the surface of the magnetic layer becomes overly rough, resulting in a deterioration in the reproduction output and other electromagnetic conversion characteristics in reproducing systems that use MR heads.

As increasingly shorter recording wavelengths are being used in current high-density recording systems, it is desirable to take into consideration not only the aforementioned surface roughness values (Ra and Rz) of the magnetic layer, but also the surface roughness of microscopic areas (for example, areas of approximately 10 μm×10 μm) in order to more accurately evaluate the output, the error rate and other characteristics of the magnetic layer. In the case of a recording and reproducing system with a minimum recording wavelength of 0.6 μm or shorter, in terms of the surface roughness determined solely from the microscopic areas, the magnetic layer must have a surface roughness, reported as an AFM surface roughness (Ra) value, of 6.0 nm or less, and preferred values fall within a range from 2.0 to 6.0 nm, and even more preferably within a range from 2.0 to 5.0 nm. If the AFM surface roughness value Ra exceeds 6.0 nm, then the spacing increases, causing the likelihood of an increase in the error rate. In contrast, if the AFM surface roughness value Ra is less than 2.0 nm, then the scratch and abrasion resistance of the magnetic layer deteriorates, which can cause a decrease in the running reliability.

The AFM surface roughness Ra value of the surface of the magnetic layer is determined based on Ra as defined in JIS-B-0601, which is determined from a surface roughness curve obtained on the basis of measurements taken using an atomic force microscope. More specifically, a probe with a radius of curvature of 10 nm or less, and preferably within a range from 2 to 10 nm, is used to measure an area of 10 μm×10 μm, and image processing is then performed to determine the centerline average surface roughness Ra.

In the present invention, the number of concavities with a depth of 30 nm or greater in the surface of the magnetic layer must be 5 per 1 $cm^2$ of surface area or less. Concavities with a depth of 30 nm or greater cause spacing loss, and cause the likelihood of an increase in the error rate. If the number of these concavities per 1 $cm^2$ of surface area is 6 or greater, then the error rate increases. There is no minimum restriction on the number of these concavities, and the fewer the better. The examples described below display values of approximately 0.1 concavities/cm².

The number of the above concavities is determined using an optical interference type three-dimensional roughness meter, by measuring the concavities with a diameter of 10 to 60 μm and a depth of 30 nm or greater, adjusting the interference intensity for an optical microscope (50 to 100× magnification), counting the number of the above concavities, for example counting at least 3 fields of view for a ½ inch wide tape of length from 1 to 5 cm, and then calculating the arithmetic mean of the counted values.

[Back Coat Layer]

The back coat layer serves both to ensure the running stability of the magnetic recording medium and to prevent the magnetic layer from being electrified. This layer contains carbon black, a non-magnetic inorganic powder other than carbon black, and a binder resin.

The back coat layer preferably contains 30 to 80% by mass carbon black with respect to the amount of the back coat layer. If the amount of carbon black is too small, then the electrification preventing effect of the back coat layer may be reduced, as may the running stability. In addition, the light transmittance of the magnetic medium may be increased, which may pose problems in systems in which tape ends are detected by the changes in the light transmittance. On the other hand, if the amount of carbon black is excessively large, then the strength of the back coat layer will be reduced, resulting in a decrease in the running durability. Carbon black may be of any type that is commonly in use and preferably has a particle size in the range of about 5 to 500 nm. The particle size of carbon black is generally measured by a transmission electron microscope.

It is preferred that the carbon black contain minimal amounts of water-soluble sodium ions and water-soluble calcium ions: the amount of the water-soluble sodium ions is preferably 500 ppm or less, more preferably 300 ppm or less while the amount of the water-soluble calcium ions is preferably 300 ppm or less, more preferably 200 ppm or less. When contained in amounts greater than the specified range, the water-soluble sodium ions or the water-soluble calcium ions may form salts with organic acids (in particular, fatty acids) present in the coating. Such salts may seep out to the surface of the coating, causing drop-outs or an increase in the error rate.

Aside from carbon black, the back coat layer may further contain various non-magnetic inorganic powders to control the mechanical strength of the magnetic recording medium. Examples of such inorganic powders include $\alpha\text{-Fe}_2\text{O}_3$, $\text{CaCO}_3$, titanium oxide, barium sulfate, and $\alpha\text{-Al}_2\text{O}_3$. The amount of the non-magnetic inorganic powder is preferably in the range of 0.1 to 20 parts by mass, and more preferably in the range of 0.5 to 15 parts by mass, with respect to 100 parts by mass of carbon black. The non-magnetic inorganic powder preferably has an average particle size of 0.01 to 0.5 μm. Too small an amount of the non-magnetic inorganic powder may lead to insufficient mechanical strength of the back coat layer, whereas too large an amount of the powder may result in substantial abrasion of guide members that slide against the tape or may cause scratches on the magnetic layer.

Aside from the above-described materials, the back coat layer may contain binders such as thermoplastic resins, thermosetting or thermoreactive resins, and radiation-curable (electron beam- or UV-curable) resins. These binder resins are used in proper combinations depending on the characteristics of the magnetic recording medium and the conditions for the process. The binders can be properly selected from those described with reference to the lower non-magnetic layer.

The amount of the binder resin for use in the back coat layer is preferably in the range of 15 to 200 parts by mass, and more preferably in the range of 50 to 180 parts by mass, with respect to 100 parts by mass of carbon black and the non-magnetic inorganic powder combined. If the amount of the binder resin is too large, then the friction between the tape and the guide rollers and other components that the tape slides against will become excessive, resulting in decreased running stability and making the tape prone to running failures. Too large an amount of the binder resin can also cause problems such as the back coat layer's blocking to the magnetic layer. Conversely, if the amount of the binder resin is too small, then the strength of the back coat layer will be decreased, often resulting in reduced running durability.

When necessary, a dispersing agent such as a surfactant, a lubricant such as a higher fatty acid, a fatty acid ester, and a silicone oil, and various other additives may be added to the back coat layer.

Such a lubricant is properly selected from those described with reference to the lower non-magnetic layer. While the amount of the lubricant in the back coat layer may be adjusted depending on its purpose, the lubricant is preferably contained in an amount of 1 to 20% by mass with respect to the total mass of carbon black and the inorganic powders other than carbon black.

The coating for forming the back coat layer is prepared by adding an organic solvent to the above-described components. Such an organic solvent may be any organic solvent and is preferably selected from those described with reference to the lower non-magnetic layer. The organic solvent is preferably used in an amount of 100 to 900 parts by mass with respect to 100 parts by mass of the carbon black, the various inorganic powders other than carbon black, and the binder resin combined.

After calendering, the back coat layer typically has a thickness of 1.0 μm or less, preferably from 0.1 to 1.0 μm, and more preferably from 0.2 to 0.8 μm. If the back coat layer is too thick, then the friction between the back coat layer and a guide roller and other components that the tape slides against becomes excessive, resulting in a decreased running stability. On the other hand, the back coat layer, when too thin, becomes susceptible to abrasion during the running of the magnetic recording medium. Also, when the back coat layer is too thin, the surface smoothness of the back coat layer is reduced due to the surface roughness of the non-magnetic support. As a result, when the back coat layer is hardened by heat, the surface roughness of the back coat layer tends to be transferred to the surface of the magnetic layer to cause a reduction in each of the power output at higher range, S/N, and C/N.

[Non-magnetic Support]

The non-magnetic support may be formed from any suitable material selected from various flexible materials and rigid materials depending on its purposes and may be sized and shaped into a desired size and shape, such as tape-like shape, depending on the standard that the support is required to meet. For example, a preferred flexible material may be a polyester, such as polyethylene terephthalate, or polyethylene naphthalate; a polyolefin, such as polypropylene; or various other resins, such as polyamide, polyimide, and polycarbonate.

Preferably, the non-magnetic support is 3.0 to 15.0 μm thick and may be shaped into any desired shape, such as tape-, sheep-, card-, or dick-like shape. The non-magnetic support can be made from various materials selected to suit its shape and requirements.

The non-magnetic support for use in the present invention typically has a surface roughness as measured in the centerline average surface roughness Ra of 20 nm or less, preferably 15 nm or less. If necessary, the surface roughness of the non-magnetic support can be adjusted as desired depending on the size and the amount of the filler added to the non-magnetic support. Examples of the fillers include oxides and carbonates of Ca, Si, Ti, and Al, and fine powders of organic resins such as acryl-based resins. Particularly preferred are combinations of $Al_2O_3$ and organic resin fine powders.

[Production Process]

A magnetic recording medium according to the present invention with the formation described above can be produced by conducting a step A of forming the lower non-magnetic layer by applying a non-magnetic layer coating onto one surface of the non-magnetic support and subsequently drying and curing the coating, a step B of forming the upper magnetic layer, after the step A, by applying a magnetic layer coating onto the cured lower non-magnetic layer and subsequently drying the coating, and a step C of forming the back coat layer by applying a back coat layer coating onto the other surface of the non-magnetic support and subsequently drying the coating, and performing a calendering step D following completion of both the step A and the step C.

Each of the processes for producing the coatings for the back coat layer, the lower non-magnetic layer, and the magnetic layer involves at least a kneading step and a dispersing step, and other optional steps that are carried out before or after each of the first two steps, including a mixing step, a viscosity-adjusting step, and a filtration step. Each step may consist of two or more sub-steps. Any of the materials for use in the present invention, including the ferromagnetic powder, the non-magnetic inorganic powder, the binder, the abrasive, the carbon black, the lubricant, and the solvent, may be added at the beginning of, or during, any of the aforementioned steps. Each material may be added in two or more separate steps.

For kneading/dispersing of each coating, known production techniques can be used during part of, or throughout, the step. For the kneading step, however, it is preferred to use a high-power kneader such as a continuous kneader or a pressure kneader. A continuous kneader or a pressure kneader is used to knead/mix the ferromagnetic powder or the non-magnetic inorganic powder, the binder, and a small amount of the solvent. The slurry is preferably kneaded at a temperature of 50° C. to 110° C.

A dispersion medium having a high specific gravity is preferably used in each coating. Preferred examples include ceramic medium such as zirconia and titania. Conventional glass beads are undesirable since upon dispersing, the beads wear to produce water-soluble sodium ions and water-soluble calcium ions as impurities of the coating.

The coating method includes various known methods such as a gravure coating, a reverse roll coating, a die nozzle coating, or bar coating methods.

When producing the magnetic recording medium, the lower non-magnetic layer formation step A, the upper magnetic layer formation step B, the back coat layer formation step C, and the calendering step D can be performed in a number of different sequences. The important factors to ensure are that the upper magnetic layer is formed after curing of the lower non-magnetic layer, and that the calendering step D is not performed with either of the surfaces of the non-magnetic support exposed, but is rather performed following the formation of a layer on each of the surfaces of the non-magnetic support.

Possible sequences in which the steps can be performed include the sequences shown below.

Step A→Step B→Step C→Step D
Step A→Step C→Step D→Step B→Step D
Step A→Step C→Step B→Step D
Step C→Step A→Step D→Step B→Step D
Step C→Step A→Step B→Step D Alternatively, the application of the back coat layer could also be performed simultaneously with the application of the lower non-magnetic layer or the upper magnetic layer.

As described above, in the case where the calendering step D is performed following completion of both the step A and the step C but prior to the step B, an additional calendering step D is preferably performed following completion of step B in order to smooth the surface of the magnetic layer. Multiple repetitions of the calendering step D may also be performed within other step sequences.

A preferred calender roll system uses a combination of metal rolls and heat resistant plastic, elastic rolls such as epoxy, polyester, nylon, polyimide, polyamide, or polyimideamide plastic rolls (carbon, metals, or other inorganic compounds may be blended with the heat-resistant plastics). Furthermore, treatment with combinations of metal rolls is preferred as it produces a smoother magnetic layer surface. In order to ensure a smoother surface, the metal rolls are positioned so as to contact the magnetic layer surface. Plastic elastic rolls are typically positioned on the other side, so as to contact the back coat layer, although metal rolls are preferred.

The calendering treatment temperature is preferably 70° C. or more, and even more preferably within a range from 90° C. to 110° C. The linear pressure is preferably $1.9 \times 10^5$ N/m (200 kg/cm) or more, and even more preferably within a range from $2.4 \times 10^5$ N/m (250 kg/cm) to $3.8 \times 10^5$ N/m (400 kg/cm), and the process speed is typically within a range from 20 m/min to 900 m/min.

In the present invention, because the upper magnetic layer is applied following curing of the lower non-magnetic layer (a so-called wet-on-dry application, W/D), the types of problems that are seen in wet-on-wet applications (W/W), in which the magnetic layer is applied while the non-magnetic layer is still wet, such as disturbance of the interface between the non-magnetic layer and the magnetic layer, and deterioration in the surface smoothness due to surface swelling, which causes an increase in the error rate, do not arise.

In the present invention, because the calendering step D is not performed with either of the surfaces of the non-magnetic support exposed, but is rather performed following the formation of a layer on each of the surfaces of the non-magnetic support, there is no direct contact between the non-magnetic support base and the calender rolls, meaning scraping of the base or the fillers contained within the base does not occur. As a result, the calendering can be performed extremely effectively. If the non-magnetic support base and the calender rolls come in direct contact, then the presence of scraped filler and the like generated by this contact increases the likelihood of concavities developing in the lower non-magnetic layer and the upper magnetic layer, making it impossible to achieve a medium with excellent surface smoothness as required by the present invention. Concavities generated in the lower non-magnetic layer or the upper magnetic layer as a result of filler scrapings or the like are particularly large, with a diameter of 10 to 60 μm, although are usually shallow, with a depth of 30 to 100 nm. However, these concavities have a marked effect on the error rate in recording and reproducing systems in which the minimum recording wavelength is 0.6 μm or shorter.

Following completion of the aforementioned step A, step B, step C, and step D, the heat curing treatment is conducted, thereby curing the upper magnetic layer and the back coat layer. The magnetic recording medium in the present invention can be preferably obtained by performing additional calendaring on both of the upper magnetic layer surface and back coat layer surface after the heat curing treatment.

EXAMPLES

The present invention will now be described in detail with reference to examples, which are not intended to limit the scope of the invention in any way.

Example 1

Preparation of a Coating for Lower Non-magnetic Layer (Preparation of Binder Solution)

| | |
|---|---|
| Electron beam-curable vinyl chloride type resin NV30 wt % (vinyl chloride-epoxy-containing monomer copolymer, average degree of polymerization = 310, epoxy content = 3 wt %, S content = 0.6 wt %, acryl content = 6 units/1 molecule, Tg = 60° C.) | 45 parts by mass |
| Electron beam-curable polyester polyurethane resin NV40 wt % (polar group —$OSO_3$ Na-containing polyester polyurethane, number average molecular weight = 26000) | 16 parts by mass |
| Methyl ethyl ketone (MEK) | 2 parts by mass |
| Toluene | 2 parts by mass |
| Cyclohexanone | 2 parts by mass |

The composition above is placed in a hyper mixer and was stirred to form a binder solution.

(Kneading)

The following composition was placed in a pressure kneader and was kneaded for 2 hours.

| | |
|---|---|
| Needle-shaped a-$Fe_2O_3$ (TODA KOGYO, DB-65, average major axis length = 0.11 μm, BET(specific surface area) = 53 $m^2$/g) | 85 parts by mass |
| Carbon black (MITSUBISHI CHEMICAL Co., Ltd., #850B, average particle size = 16 nm, BET = 200 $m^2$/g, DPB oil absorbance = 70 ml/100 g) | 15 parts by mass |
| a-$Al_2O_3$ (SUMITOMO CHEMICAL Co., Ltd., HIT-60A, average particle size = 0.20 μm) | 5 parts by mass |
| o-phthalic acid | 2 parts by mass |
| Binder solution | 67 parts by mass |

To the slurry resulting after the kneading process, the following composition was added to optimize the viscosity of the slurry for the dispersing process.

| | |
|---|---|
| MEK | 40 parts by mass |
| Toluene | 40 parts by mass |
| Cyclohexanone | 40 parts by mass |

(Dispersing)

The resulting slurry was subjected to a dispersing process in a horizontal pin mill filled to 75% capacity with zirconia beads (TORAY, torayceram φ 0.8 mm).

(Viscosity-adjusting Solution)

The following composition was placed in a hyper mixer and was stirred to form a viscosity-adjusting solution.

| | |
|---|---|
| Stearic acid | 1 part by mass |
| Butyl stearate | 1 part by mass |
| MEK | 30 parts by mass |
| Toluene | 30 parts by mass |
| Cyclohexanone | 30 parts by mass |

(Viscosity Adjustment and Final Coating)

To the slurry resulting after the dispersing process, the solution prepared above was added, and the mixture was mixed/stirred and was again subjected to the dispersing process in a horizontal pin mill, filled to 75% capacity with zirconia beads (TORAY, torayceram φ 0.8 mm), to obtain a coating. The coating was circulated for filtration through a depth filter with an absolute filtration accuracy of 1.0 μm. This gave a final coating product for the lower non-magnetic layer.

Preparation of a Coating for Magnetic Layer (Preparation of Binder Solution)

| | |
|---|---|
| Vinyl chloride type resin (ZEON Corporation, MR-110) | 11 parts by mass |
| Polyester polyurethane resin NV30% (TOYOBO, UR-8300) | 17 parts by mass |
| MEK | 7 parts by mass |
| Toluene | 7 parts by mass |
| Cyclohexanone | 7 parts by mass |

The composition above was placed in a hyper mixer and was mixed/stirred to form a binder solution.

(Kneading)

The following composition was placed in a pressure kneader and was kneaded for 2 hours.

| | |
|---|---|
| a-Fe magnetic powder (Hc = 1885Oe, Co/Fe = 20 at %, ss = 138 emu/g, BET = 58 $m^2$/g, average major axis length = 0.10 μm) | 100 parts by mass |
| a-$Al_2O_3$ (SUMITOMO CHEMICAL Co., Ltd., HIT-60A, average particle size = 0.20 μm) | 6 parts by mass |
| a-$Al_2O_3$ (SUMITOMO CHEMICAL Co., Ltd., HIT-82, average particle size = 0.13 μm) | 6 parts by mass |

-continued

| | |
|---|---|
| Phosphoric ester (TOHO CHEMICAL, PHOSPHANOL RE610) | 2 parts by mass |
| Binder solution | 49 parts by mass |

To the slurry resulting after the kneading process, the following composition was added to optimize the viscosity of the slurry for the dispersing process.

| | |
|---|---|
| MEK | 100 parts by mass |
| Toluene | 100 parts by mass |
| Cyclohexanone | 75 parts by mass |

(Dispersing)

The resulting slurry was subjected to a dispersing process in a horizontal pin mill filled to 75% capacity with zirconia beads (TORAY, torayceram φ 0.8 mm).

(Viscosity-adjusting Solution)

The following composition was placed in a hyper mixer and was mixed/stirred for 1 hour to form a viscosity-adjusting solution.

| | |
|---|---|
| Stearic acid | 1 part by mass |
| Butyl stearate | 1 part by mass |
| MEK | 100 parts by mass |
| Toluene | 100 parts by mass |
| Cyclohexanone | 250 parts by mass |

(Viscosity Adjustment)

To the slurry resulting after the dispersing process, the solution prepared above was added, and the mixture was mixed/stirred and was again subjected to the dispersing process in a horizontal pin mill, filled to 75% capacity with zirconia beads (TORAY, torayceram φ0.8 mm), to obtain a coating. The coating was circulated for filtration through a depth filter with an absolute filtration accuracy of 1.0 µm.

(Final Coating)

To 100 parts by mass of the coating resulting after filtration, 0.82 part by mass of an isocyanate compound (NIPPON POLYURETHANE INDUSTRY Co., Ltd., Coronate L) were added. The mixture was mixed/stirred and was then circulated for filtration through a depth filter with an absolute filtration accuracy of 1.0 µm to obtain a final coating product for the magnetic layer.

Preparation of a Coating for Back Coat Layer (Preparation of Binder Solution)

| | |
|---|---|
| Nitrocellulose (ASAHI KASEI, BTH1/2) | 50 parts by mass |
| Polyester polyurethane resin NV30% (TOYOBO, UR-8300) | 110 parts by mass |
| MEK | 200 parts by mass |
| Toluene | 200 parts by mass |
| Cyclohexanone | 200 parts by mass |

The composition above was placed in a hyper mixer and was mixed/stirred to form a binder solution.

(Dispersing)

The following composition was placed in a ball mill and was processed for 24 hours to thoroughly disperse the components.

| | |
|---|---|
| Carbon black (CABOT Co., Ltd., BLACK PEARLS 800, average particle size = 17 nm, BET = 220 m$^2$/g) | 75 parts by mass |
| Carbon black (CABOT Co., Ltd., BLACK PEARLS 130, average particle size = 75 nm, BET = 25 m$^2$/g) | 10 parts by mass |
| BaSO$_4$ (SAKAI CHEMICAL INDUSTRY Co., Ltd., BF-20, average particle size = 30 nm) | 15 parts by mass |
| Copper oleate | 5 parts by mass |
| Copper phthalocyanine | 5 parts by mass |
| a-almina (TAIMEI CHEMICALS Co., Ltd., TM-DR, average particle size = 0.23 µm) | 1 part by mass |
| Binder solution | 760 parts by mass |

(Viscosity-adjusting Solution)

The following composition was placed in a hyper mixer and was stirred to form a viscosity-adjusting solution.

| | |
|---|---|
| MEK | 220 parts by mass |
| Toluene | 220 parts by mass |
| Cyclohexanone | 220 parts by mass |

(Viscosity Adjustment)

To the slurry resulting after the dispersing process, the solution prepared above was added, and the mixture was mixed/stirred and was again subjected to the dispersing process for 3 hours in a ball mill. The resultant coating was circulated for filtration through a depth filter with an absolute filtration accuracy of 3.0 µm.

(Final Coating)

To 100 parts by mass of the coating resulting after filtration, 1.1 parts by mass of an isocyanate compound (NIPPON POLYURETHANE INDUSTRY Co., Ltd., Coronate L) was added. The mixture was mixed/stirred and was then circulated for filtration through a depth filter with an absolute filtration accuracy of 3.0 µm to obtain a coating for the back coat layer.

Production of Magnetic Recording Tape

The above-prepared coating for the lower non-magnetic layer was applied to one surface of a 6.1 µm thick polyethylene terephthalate film at a line speed of 100 m/min to a dry thickness of 2.0 µm. The film was then dried in an oven into which a 100° C. hot air stream was sent at a speed of 15 m/sec. Subsequently, the film was irradiated with an electron beam at a dose of 4.5 Mrad and was then wound.

The above-prepared coating for the magnetic layer was then applied over the cured lower non-magnetic layer at a line speed of 100 m/min to a dry thickness of 0.20 µm. While still wet, the coating was exposed to a magnetic field generated by a solenoid (5000 Oe) to orient the magnetic powder and was dried in an oven into which a 100° C. hot air stream was sent at a speed of 15 m/sec. Subsequently, the above-prepared coating for the back coat layer was applied to the other surface of the polyethylene terephthalate film to a dry thickness of 0.6 μm. The film was then dried in an oven into which a 100° C. hot air stream was sent at a speed of 15 m/sec and was then wound. In this manner, an uncalendered magnetic tape web was obtained.

Subsequently, the uncalendered magnetic tape web was fed out through feed rollers, and calendering of both the magnetic layer surface and the back coat layer surface was performed using a calendering apparatus with the roll configuration described below, under conditions including a temperature of 100° C., a linear pressure of 350 kg/cm, and a process speed of 100 m/min. The treated tape web was then wound.

Roll Configuration: 10 nips comprising combinations of a metal roll (S) and a metal roll (S).

The wound roll was placed in an oven for 24 hours at 60° C. to effect heat curing. Following heat curing, the tape web was subjected to a second calendering treatment using the same roll configuration and the same conditions described above, and was then rewound. The tape was then slit into ½ inch wide (12.65 mm) strips to obtain a magnetic tape.

Example 2

A magnetic tape was produced in the same manner as in Example 1, with the exception of subjecting the uncalendered magnetic tape web to two calendering treatments using a calendering apparatus with the roll configuration described below.

Roll Configuration: 10 nips comprising combinations of a metal roll (S) and a polyamide resin roll (R). The metal rolls were positioned so as to contact the magnetic layer surface, and the elastic rolls were positioned so as to contact the back coat layer surface.

Example 3

A magnetic tape was produced in the same manner as in Example 2, by subjecting the uncalendered magnetic tape web to two calendering treatments using the same calendering apparatus as in Example 2, but with the exception of altering the conditions to include a temperature of 100° C., a linear pressure of 300 kg/cm, and a process speed of 100 m/min.

Example 4

A magnetic tape was produced in the same manner as in Example 2, by subjecting the uncalendered magnetic tape web to two calendering treatments using the same calendering apparatus as in Example 2, but with the exception of altering the conditions to include a temperature of 80° C., a linear pressure of 300 kg/cm, and a process speed of 100 m/min.

In each of the comparative examples described below, the same coatings as those described in Example 1 were used for the coatings for the lower non-magnetic layer, the upper magnetic layer, and the back coat layer respectively.

Comparative Example 1

The above-prepared coating for the lower non-magnetic layer was applied to one surface of a 6.1 μm thick polyethylene terephthalate film at a line speed of 100 m/min to a dry thickness of 2.0 μm. The film was then dried in an oven into which a 100° C. hot air stream was sent at a speed of 15 m/sec. Subsequently, the film was subjected to calendering treatment using a calendering apparatus with the same roll configuration as in Example 1 (as described below), under conditions including a temperature of 100° C., a linear pressure of 350 kg/cm, and a process speed of 100 m/min. The film was then irradiated with an electron beam at a dose of 4.5 Mrad, and the tape web was subsequently wound.

Roll Configuration: 10 nips comprising combinations of a metal roll (S) and a metal roll (S).

The above-prepared coating for the magnetic layer was then applied over the cured lower non-magnetic layer at a line speed of 100 m/min to a dry thickness of 0.20 μm. While still wet, the coating was exposed to a magnetic field generated by a solenoid of 5000 Oe to orient the magnetic powder, and was then dried in an oven into which a 100° C. hot air stream was sent at a speed of 15 m/sec. The resulting tape web was then rewound.

Subsequently, the above-prepared coating for the back coat layer was applied to the other surface of the polyethylene terephthalate film to a dry thickness of 0.6 μm. The film was then dried in an oven into which a 100° C. hot air stream was sent at a speed of 15 m/sec. The tape web was subsequently subjected to a second calendering treatment using the same roll configuration and the same conditions described above, and was then rewound.

The wound roll was placed in an oven for 24 hours at 60° C. to heat cure the tape. Following heat curing, the raw tape was subjected to yet another calendering treatment using the same roll configuration and the same conditions described above, and was then rewound. The tape was then slit into ½ inch wide (12.65 mm) strips to obtain a magnetic tape.

Comparative Example 2

A magnetic tape was produced in the same manner as in Comparative Example 1, with the exception of subjecting the magnetic tape web to three calendering treatments using a calendering apparatus with the roll configuration described below.

Roll Configuration: 10 nips comprising combinations of a metal roll (S) and a polyamide resin roll (R). The metal rolls were positioned so as to contact the magnetic layer surface, and the elastic rolls were positioned so as to contact the back coat layer surface.

Comparative Example 3

A magnetic tape was produced in the same manner as in Comparative Example 2, by subjecting the magnetic tape web to three calendering treatments using the same calendering apparatus as Comparative Example 2, but with the exception of altering the conditions to include a temperature of 100° C., a linear pressure of 300 kg/cm, and a process speed of 100 m/min.

Comparative Example 4

No Lower Non-magnetic Layer

The above-prepared coating for the magnetic layer was applied to one surface of a 6.1 μm thick polyethylene terephthalate film at a line speed of 100 m/min to a dry thickness of 0.20 μm. While still wet, the coating was exposed to a magnetic field generated by a solenoid of 5000 Oe to orient the magnetic powder, and was then dried in an oven into which a 100° C. hot air stream was sent at a speed of 15 m/sec. The film was then irradiated with an electron beam at a dose of 4.5 Mrad, and the resulting tape web was wound.

Subsequently, the above-prepared coating for the back coat layer was applied to the other surface of the polyethylene terephthalate film to a dry thickness of 0.6 μm. This film was dried in an oven into which a 100° C. hot air stream was sent at a speed of 15 m/sec, and the tape web was then rewound. This process completed the formation of the uncalendered magnetic tape web.

Subsequently, the uncalendered magnetic tape web was fed out through feed rollers, and calendering of both the magnetic layer surface and the back coat layer surface was performed using a calendering apparatus with the same roll configuration as in Comparative Example 2 (as described below), under conditions including a temperature of 100° C., a linear pressure of 300 kg/cm, and a process speed of 100 m/min. The treated tape web was then wound.

Roll Configuration: 10 nips comprising combinations of a metal roll (S) and a polyamide resin roll (R). The metal rolls were positioned so as to contact the magnetic layer surface, and the elastic rolls were positioned so as to contact the back coat layer surface.

The wound roll was placed in an oven for 24 hours at 60° C. to effect heat curing. Following heat curing, the tape web was subjected to a second calendering treatment using the same roll configuration and the same conditions described above, and was then rewound. The tape was then slit into ½ inch wide (12.65 mm) strips to obtain a magnetic tape.

[Evaluation of Magnetic Tapes]

(Centerline Average Surface Roughness Ra, Ten-point Average Surface Roughness Rz)

Using a Talystep system (manufactured by Taylor Hobson), the centerline average surface roughness Ra (nm) and the ten-point average surface roughness Rz (nm) were determined for the surface of the magnetic layer based on measurements taken according to JIS-B-0601. The conditions for the measuring instrument included a filter condition of 0.30 to 9.0 Hz, a probe of 0.1×2.5 μm stylus, probe pressure of 2 mg, measurement speed of 0.03 mm/sec, and a measured length of 500 μm.

(AFM Centerline Average Surface Roughness: Ra(nm))

Using AutoProbe M5 atomic force microscope (AFM) (Thermo Microscpes), the AFM average surface roughness Ra was determined.
The number of times that the analysis was performed: N=3
Probe: Silicon single crystal probe (Nanosensors, radius of curvature=10 nm)
Scan mode: non-contact mode
Scan area: 10 μm×10 μm
Pixel number: 512×512 data points
Scan rate: 0.6 Hz
Measurement environment: at room temperature in the atmosphere
Data processing: Secondary slope correction was performed along horizontal and vertical directions for the whole image data.

(Number of Concavities with a Depth of 30 nm or Greater)

The number of concavities with a depth of 30 nm or greater per 1 $cm^2$ of surface area of the magnetic layer was determined in the following manner. A 12.65 mm wide tape was cut into 3 cm lengths to prepare three tape fragment samples. The surface of the magnetic layer of each tape fragment sample was inspected under an optical microscope to detect concavities. The depth of the detected concavities was measured using an optical interference type three-dimensional roughness meter (manufactured by WYKO), with a cutoff of 0.25 nm and a measurement range of 250 μm×250 μm. The number of concavities with a depth of 30 nm or greater in the surface of the magnetic layer was then counted. The same procedure was repeated for the remaining two tape fragment samples, and the number of concavities with a depth of 30 nm or greater was counted for each sample. The arithmetic mean of the three concavity count values was then determined. Using this arithmetic mean, the number of concavities per 1 $cm^2$ of surface area was calculated.

(Error Rate)

To determine the error rate, data were written using a MIG head (head width: 24 μm) on all tracks throughout the length of the tape and were subsequently read out using an MR head (head width: 14 μm). The minimum recording wavelength was 0.37 μm and the number of tracks was 450.

The results of the above analyses are shown in Table 1. As is evident from Table 1, each of the magnetic tapes of Examples 1 through 4 displayed an AFM surface roughness Ra for the surface of the magnetic layer of 6 nm or less, and in each case the number of concavities with a depth of 30 nm or greater in the surface of the magnetic layer was restricted to 5 concavities per 1 $cm^2$ of surface area or less, and the error rate was extremely low.

In Comparative Examples 1 to 3, because calendering was also conducted following formation of the lower non-magnetic layer but prior to the formation of the back coat layer, there was direct contact between the base film and the calender rolls, resulting in a marked increase in the number of concavities when compared with the corresponding Examples 1 to 3. This increases in the number of concavities caused an increase in the error rate.

TABLE 1

| | Application method for multi-layer | Step sequence* | Calendering Roll configuration | Condition | Ra (nm) | Rz (nm) | AFM Ra (nm) | Concavity (number/$cm^2$) | Write error (error/MB) |
|---|---|---|---|---|---|---|---|---|---|
| Example 1 | W/D | A→B→C→D | S-S | 100° C., 350 kg/cm | 2.8 | 17.1 | 4.5 | 0.1 | 0.148 |
| Example 2 | W/D | A→B→C→D | S-R | 100° C., 350 kg/cm | 2.8 | 18.3 | 4.3 | 0.3 | 0.170 |
| Example 3 | W/D | A→B→C→D | S-R | 100° C., 300 kg/cm | 3.1 | 20.9 | 4.8 | 0.6 | 0.226 |
| Example 4 | W/D | A→B→C→D | S-R | 80° C., 300 kg/cm | 3.1 | 21.7 | 5.8 | 4.8 | 0.500 |
| Comparative Example 1 | W/D | A→D→B→C→D | S-S | 100° C., 350 kg/cm | 3.1 | 19.4 | 4.3 | 16.7 | 0.780 |

TABLE 1-continued

| | Application method for multi-layer | Step sequence* | Calendering Roll configuration | Calendering Condition | Ra (nm) | Rz (nm) | AFM Ra (nm) | Concavity (number/cm²) | Write error (error/MB) |
|---|---|---|---|---|---|---|---|---|---|
| Comparative Example 2 | W/D | A→D→B→C→D | S-R | 100° C., 350 kg/cm | 3.2 | 21.0 | 5.3 | 23.3 | 1.286 |
| Comparative Example 3 | W/D | A→D→B→C→D | S-R | 100° C., 300 kg/cm | 3.6 | 23.8 | 5.8 | 26.0 | 1.539 |
| Comparative Example 4 | Single layer | B→C→D | S-R | 100° C., 300 kg/cm | 5.6 | 35.0 | 7.1 | 0.5 | 1.800 |

*Step sequence;
A: the lower non-magnetic layer formation step
B: the upper magnetic layer formation step
C: the back coat layer formation step
D: the calendering step

What is claimed is:

1. A magnetic recording medium, comprising
   a lower non-magnetic layer containing at least a non-magnetic powder and a binder resin on one surface of a non-magnetic support,
   an upper magnetic layer containing at least a ferromagnetic powder and a binder resin on the lower non-magnetic layer, and
   a back coat layer on the other surface of the non-magnetic support, wherein
   the thickness of the upper magnetic layer is within the range from 0.03 to 0.30 μm,
   the AFM surface roughness Ra of the upper magnetic layer is 6 nm or less,
   the number of concavities with a depth of 30 nm or greater in the surface of the upper magnetic layer is 5 per 1 cm² of surface area or less, and
   the magnetic recording medium is formed by a process comprising:
   a step A of forming a lower non-magnetic layer by applying a non-magnetic layer coating containing at least a non-magnetic powder and a binder resin onto one surface of a non-magnetic support and subsequently drying and curing the non-magnetic layer coating;
   a step B of forming an upper magnetic layer by applying a magnetic layer coating containing at least a ferromagnetic powder and a binder resin onto the lower non-magnetic layer and subsequently drying the magnetic layer coating;
   a step C of forming a back coat layer by applying a back coat layer coating onto another surface of the non-magnetic support and subsequently drying the back coat layer coating; and
   a step D of performing calendering following completion of both the step A and the step C.

2. The magnetic recording medium according to claim 1, wherein the average major axis length of the ferromagnetic powder is 0.1 μm or less.

3. The magnetic recording medium according to claim 1 or 2, wherein the medium is used in a recording and reproducing system in which the minimum recording wavelength is 0.6 μm or shorter.

* * * * *